(12) United States Patent
Compton et al.

(10) Patent No.: US 10,726,090 B1
(45) Date of Patent: Jul. 28, 2020

(54) PER-USER ACCURACY MEASURE FOR SOCIAL NETWORK BASED GEOCODING ALGORITHMS

(71) Applicant: HRL Laboratories, LLC, Malibu, CA (US)

(72) Inventors: Ryan F. Compton, Los Angeles, CA (US); David L. Allen, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 407 days.

(21) Appl. No.: 14/539,828

(22) Filed: Nov. 12, 2014

Related U.S. Application Data

(63) Continuation-in-part of application No. 14/295,101, filed on Jun. 3, 2014, now Pat. No. 9,953,080, which
(Continued)

(51) Int. Cl.
*G06F 16/955* (2019.01)
*G06F 16/22* (2019.01)
(Continued)

(52) U.S. Cl.
CPC ............ *G06F 16/955* (2019.01); *G06F 16/22* (2019.01); *G06F 16/29* (2019.01); *H04L 12/1831* (2013.01); *H04L 67/22* (2013.01)

(58) Field of Classification Search
CPC ......... G06F 17/30876; G06F 17/30241; G06F 17/30312; H04L 12/1831; H04L 67/22; G06Q 50/01
(Continued)

(56) References Cited

U.S. PATENT DOCUMENTS

| 9,147,202 B1 | 9/2015 | Muse |
|---|---|---|
| 9,613,149 B2 | 4/2017 | Spivack |

(Continued)

FOREIGN PATENT DOCUMENTS

| CN | 102088419 | 6/2011 |
|---|---|---|
| CN | 102577494 | 7/2012 |
| CN | 102883259 | 1/2013 |

OTHER PUBLICATIONS

S. Ahern, M. Naaman, R. Nair. and J. H.-I. Yang. World explorer: Visualizing aggregate data from unstructured text in geo-referenced collections. In Proceedings of JCDL '07, pp. 1-10, New York, NY, USA, 2007. ACM.

(Continued)

*Primary Examiner* — Tony Mahmoudi
*Assistant Examiner* — Kamal K Dewan
(74) *Attorney, Agent, or Firm* — Tope-McKay & Associates

(57) ABSTRACT

Described is a system for geocoding social networks by minimizing total variation. A set of social media data from a social media platform having users is received. A social network is generated from the set of social media data based on communication between users. A ground truth set of locations is determined for users who make their locations public, and the ground truth set of locations is propagated across the social network to generate a location estimate for each user. A confidence measure for each location estimate is then generated.

7 Claims, 5 Drawing Sheets

Related U.S. Application Data is a continuation-in-part of application No. 14/210,265, filed on Mar. 13, 2014, now Pat. No. 9,794,358.

(60) Provisional application No. 61/903,618, filed on Nov. 13, 2013, provisional application No. 61/831,058, filed on Jun. 4, 2013, provisional application No. 61/809,160, filed on Apr. 5, 2013.

(51) Int. Cl.
*G06F 16/29* (2019.01)
*H04L 12/18* (2006.01)
*H04L 29/08* (2006.01)

(58) Field of Classification Search
USPC .................. 707/741, 751, 999.101, E17.109; 715/751
See application file for complete search history.

(56) References Cited

U.S. PATENT DOCUMENTS

| | | | |
|---|---|---|---|
| 9,635,116 B2 | 4/2017 | Anand | |
| 9,742,866 B2 | 8/2017 | Shribman | |
| 2005/0102044 A1* | 5/2005 | Kohn | G06F 17/11 700/28 |
| 2007/0203644 A1 | 8/2007 | Thota et al. | |
| 2008/0288326 A1 | 11/2008 | Abramowicz | |
| 2008/0319558 A1* | 12/2008 | Resende | G06F 7/544 700/28 |
| 2010/0082247 A1* | 4/2010 | Klein | G01C 21/20 701/533 |
| 2011/0029398 A1 | 2/2011 | Boudville | |
| 2011/0055132 A1* | 3/2011 | Mahdian | G06Q 10/00 706/46 |
| 2011/0125826 A1 | 5/2011 | Erhart | |
| 2011/0256881 A1* | 10/2011 | Huang | G01S 5/0257 455/456.1 |
| 2012/0135756 A1 | 5/2012 | Rosso | |
| 2012/0166367 A1 | 6/2012 | Murdock | |
| 2012/0303439 A1 | 11/2012 | Flitcorft | |
| 2012/0330721 A1 | 12/2012 | Volpe et al. | |
| 2013/0036116 A1* | 2/2013 | Lin | G06Q 30/02 707/736 |
| 2013/0041860 A1 | 2/2013 | Lawrence | |
| 2013/0073336 A1 | 3/2013 | Heath | |
| 2013/0073388 A1* | 3/2013 | Heath | G06Q 50/01 705/14.53 |
| 2013/0073995 A1 | 3/2013 | Piantino et al. | |
| 2013/0191395 A1* | 7/2013 | Dowlaty | G06Q 50/01 707/740 |
| 2013/0218965 A1 | 8/2013 | Abrol | |
| 2013/0304818 A1 | 11/2013 | Brumleve | |
| 2013/0304909 A1 | 11/2013 | Pappu | |
| 2013/0325977 A1* | 12/2013 | Drews | G06F 17/30 709/206 |
| 2014/0040371 A1* | 2/2014 | Gurevich | H04L 61/609 709/204 |
| 2014/0087780 A1* | 3/2014 | Abhyanker | H04W 4/90 455/521 |
| 2014/0089343 A1 | 3/2014 | Burris | |
| 2014/0141808 A1* | 5/2014 | Deng | H04W 4/028 455/456.3 |
| 2014/0156341 A1 | 6/2014 | Kurk | |
| 2014/0222908 A1* | 8/2014 | Park | G06Q 10/10 709/204 |
| 2014/0258197 A1 | 9/2014 | Davulcu | |
| 2014/0259113 A1 | 9/2014 | Harris | |
| 2014/0279996 A1* | 9/2014 | Teevan | G06F 17/30722 707/706 |
| 2015/0227851 A1 | 8/2015 | Kaisser | |

OTHER PUBLICATIONS

A. Ahmed, L. Hong, and A. J. Smola. Hierarchical geographical modeling of user locations from social media posts. In Proceedings of the 22nd International Conference on World Wide Web, WWW '13, pp. 25-36, Republic and Canton of Geneva, Switzerland, 2013. International World Wide Web Conferences Steering Committee.

E. Amitay, N. Har'El, R. Sivan, and A. Soffer. Web-a-where: geotagging web content. In Proceedings of SIGIR '04, pp. 273-280. ACM, 2004.

X. Bresson, T. Laurent, D. Uminsky, and J. H. von Brecht. Multiclass total variation clustering. In Advances in Neural Information Processing Systems, 2013.

R. Compton, D. Jurgens, and D. Allen. Geotagging one hundred million twitter accounts with total variation minimization. arXiv preprint arXiv:1404.7152, 2014.

R. Compton, C. Lee, T.-C. Lu, L. De Silva, and M. Macy. Detecting future social unrest in unprocessed twitter data:"emerging phenomena and big data". In Intelligence and Security Informatics (ISI), 2013 IEEE International Conference on, pp. 56-60. IEEE, 2013.

D. J. Crandall, L. Backstrom, D. Huttenlocher, and J. Kleinberg. Mapping the world's photos. In Proceedings of WWW '09, pp. 761-770, New York, NY, USA, 2009. ACM.

J. Gelernter and S. Balaji. An algorithm for local geoparsing of microtext. GeoInformetica, 17(4), pp. 635-667, Jan. 2013.

J. Gelernter, G. Ganesh, H. Krishnakumar, and W. Zhang. Automatic gazetteer enrichment with user-geocoded data. In Proceedings of GEOCROWD '13, pp. 87-94. New York, NY, USA, 2013. ACM.

T. Goldstein and S. Osher. The split bregman method for l1 regularized problems, pp. 1-21.

N. Ireson and F. Ciravegna. Toponym resolution in social media. In Proceedings of ISWC '10, pp. 370-385, Berlin, Heidelberg, 2010. Springer-Verlag.

D. Jurgens. Thats what friends are for: Inferring location in online social media platforms based on social relationships. In Seventh International AAAI Conference on Weblogs and Social Media, 2013, pp. 273-282.

P. Kelm, V. Murdock, S. Schmiedeke, S. Schockaert, P. Serdyukov, and O. Van Laere. Georeferendng in social networks. In Social Media Retrieval, pp. 115-141. Springer, 2013.

K. Leetaru and P. A Schrodt. Gdelt: Global data on events, location, and tone, 1979-2012. In Paper presented at the ISA Annual Convention, vol. 2, p. 4, 2013.

K. Leetaru, S. Wang, G. Cao, A. Padmanabhan, and E. Shook. Mapping the global twitter heartbeat: The geography of twitter. First Monday, 18(5), 2013.

J. L. Leidner. Toponym resolution in text: "Which Sheffield is it?". In Proceedings of SIGIR '04, p. 602, 2004.

M. D. Lieberman, H. Samet. and J. Sankaranarayanan, Geotagging with local lexicons to build indexes for textually-specified spatial data. In Proceedings of ICDE'10, pp. 201-212, 2010.

J. Mahmud, J. Nichols, and C. Drews. Where is this tweet from? inferring home locations of twitter users. In ICWSM, 2012, pp. 511-514.

K. S. McCurley, Geospatial mapping and navigation of the web. In Proceedings of WWW '01, pp. 221-229, New York, NY, USA, 2001. ACM.

N. O'Hare and V. Murdock. Modeling locations with social media. Inf. Retr., 16(1), pp. 30-62, Feb. 2013.

S. Overell and S. Rüger. Using co-occurrence models for placename disambiguation. Int. J. Geogr. Inf. Sci., 22(3). pp. 265-287, Jan. 2008.

N. Ramakrishnan, P. Butler, S. Muthiah, N. Self. R. Khandpur, P. Saraf, W. Wang, J. Cadena, A. Vullikanti, G. Korkmaz, et al. 'beating the news' with embers: Forecasting civil unrest using open source indicators. arXiv preprint arXiv:1402.7035, 2014.

T. Rattenbury and M. Naaman. Methods for extracting place semantics from flickr tags. ACM Trans. Web. 3(1):1-1:30, Jan. 2009.

L. Rudin, S. Osher, and E. Fatemi. Nonlinear total variation based noise removal algorithms. Physica D: Nonlinear Phenomena, 60(1-4), pp. 259-268, Nov. 1992.

(56) References Cited

OTHER PUBLICATIONS

P. Serdyukov, V. Murdock, and R. Van Zwol. Placing flickr photos on a map. In Proceedings of the 32nd international ACM SIGIR conference on Research and development in information retrieval, pp. 484-491. ACM. 2009.

L. M. Smith, M. S. Keegan, T. Wittman, G. O. Mohler, and A. L. Bertozzi, Improving density estimation by incorporating spatial information. EURASIP J. Adv. Signal Process. 2010:7:1-7:12, Feb. 2010.

O. Van Laere, J. Quinn, S. Schockaert, and B. Dhoedt. Spatially aware term selection for geotagging. IEEE Trans. on Knowl. and Data Eng., 26(1), pp. 221-234, Jan. 2014.

O. Van Laere, S. Schookaert, and B. Dhoedt. Finding locations of flickr resources using language models and similarity search. In Proceedings of ICMR '11, pp. 48:1-48:8, New York, NY, USA, 2011. ACM.

Y. Vardi and C. H. Zhang. The multivariate L1-median and associated data depth. Proceedings of the National Academy of Sciences of the United States of America, 97, No. 4 (2000), pp. 1423-1426.

J. Xu, T.-C. Lu, R. Compton. and D. Allen. "Quantifying cross-platform engagement through large-scale user alignment." In Proceedings of the 2014 ACM conference on Web science, pp. 281-282. ACM, 2014.

Y. Yamaguchi, T. Amagasa, and H. Kitagawa. Landmark-based user location inference in social media. In Proceedings of the First ACM Conference on Online Social Networks, COSN '13, pp. 223-234, New York, NY, USA, 2013. ACM.

Z. Yin, L. Cao, J. Han, C. Zhai, and T. Huang. Geographical topic discovery and comparison. In Proceedings of WWW '11, p. 247. New York, New York, USA, 2011. ACM Press.

X. Zhu and Z. Ghahramani. Learning from labeled and unlabeled data with label propagation. Technical report, Technical Report CMU-CALD-02-107, Carnegie Mellon University, 2002.

Cheng, Z.; Caverlee, J.; and Lee, K. (2010) "You are where you tweet: a content-based approach to geo-locating twitter users," In Proceedings of the 19th ACM international conference on Information and knowledge management, pp. 759-768. ACM.

Davis Jr, C.; Pappa, G.; de Oliveira, D.; and de L Arcanjo, F. (2011) "Inferring the location of twitter messages based on user relationships." Transactions in GIS 15(6): pp. 735-751.

Goldenberg, J., and Levy, M. (2009) "Distance is not dead: Social interaction and geographical distance in the interact era." arXiv preprint arXiv:0906.3202, pp. 1-22.

Hecht, B.; Hong, L.; Suh, B.; and Chi, E. (2011) "Tweets from justin bieber's heart: the dynamics of the location field in user profiles." In proceedings of the 2011 annual conference on Human factors in computing systems, pp. 237-246. ACM.

Ikawa, Y.; Enoki, M.; and Tatsubori, M. (2012) "Location inference using microblog messages." In Proceedings of the 21st international conference companion on World Wide Web, pp. 687-690. ACM.

Mahmud, J.; Nichols, J.; and Drews, C. (2012) "Where is this tweet from? inferring home locations of twitter users." Proc AAAI ICWSM 12, pp. 511-514.

Mok, D.; Wellman, B.; and Carrasco, J. (2010) "Does distance matter in the age of the internet?" Urban Studies 47(13): pp. 2747-2783.

Pontes, T.; Vasconcelos, M.; Almeida, J.; Kumaraguru, P.; and Almeida, V. (2012) "We know where you live: Privacy characterization of foursquare behavior." In UbiComp '12, pp. 898-905.

Sadilek, A.; Kautz, H.; and Bigham, J. (2012) "Finding your friends and following them to where you are." In Proceedings of the fifth ACM international conference on Web search and data mining. pp. 723-732. ACM.

Zhu, Xiaojin, and Zoubin Ghahramani. "Learning, from labeled and unlabeled data with label propagation." Technical Report CMU-CALD-02-107, Carnegie Mellon University, (2002), pp. 1-17.

Vincenty, Thaddeus. Direct and inverse solutions of geodesics on the ellipsoid with application of nested equations. Survey review 23.176 (1975): pp. 88-93.

Ronkainen, Oja, and Orponen. (2003). Computation of the multivariate Oja median. Developments in Robust Statistics, pp. 344-359. http://users.ics.aalto.fi/orponen/papers/ojamed.pdf.

Vardi and Zhang. (2000). The multivariate L1-median and associated data depth. Proceedings of the National Academy of Sciences. 97(4): pp. 1423-1426. http://www.pnas.org/content/97/4/1423.full.pdf.

PCT International Search Report and the Written Opinion of the International Searching Authority for PCT/US2014/026646, dated Jul. 14, 2014, pp. 1-9.

De Silva, Lalindra, and Ellen Riloff. "User Type Classification of Tweets with Implications for Event Recognition." Proceedings of the Joint Workshop on Social Dynamics and Personal Attributes in Social Media, pp. 98-108, Baltimore, Maryland USA, Jun. 27, 2014, 2014 Association for Computational Linguistics.

Ryan Compton, Craig Lee, Tsai-Ching Lu, Lalindra De Silva, Michael Macy. "Detecting Future Social Unrest in Unprocessed Twitter Data", IEEE International Conference on Intelligence and Security Informatics (ISI), 2013, pp. 56-60.

H. Kwak, C. Lee, H. Park, and S. Moon, "What is twitter, a social network or a news media?" WWW 2010, Apr. 26-30, 2010, pp. 1-10.

https://www.tumblr.com/about downloaded Dec. 2014.

http://gnip.com/tumblr/ download Dec. 2014.

Sandra Gonzalez-Bailon, Javier Borge-Holthoefer, Alejandro Rivero, Yamir Mareno, "The Dynamics of Protest Recruitment through an Online Network", Nature Scientific Reports, vol. 1, Article 197, Dec. 2011, doi: 10. 1038/srep00197, pp. 1-7.

Ekaterina Stepanova, "The Role of Information Communication Technologies in the 'Arab Sping'", PONARS Eurasia Policy Memo No. 159, 2011, pp. 1-6.

Chen, J. Arredondo, R. P. Khandpur, C.-T. Lu, D. Mares. D. Gupta, and N. Ramakrishnan, "Spatial surrogates to forecast social mobilization and civil unrests," Position Paper in CCC Workshop on "From GPS and Virtual Globes to Spatial Computing", 2012, pp. 1-3.

Ting Hua, Feng Cheng, Liang Zhao, Chang-Tien Lu, Naren Ramakrishnan, "STED: Semi-Supervised Targeted Event Detection", KDD '13 Proceedings of the 19th ACM SIGKDD international conference on Knowledge discovery and data mining, pp. 1466-1469.

David Jurgens, "That's what friends are for: inferring location in online social media platforms based on social relationships", Proceedings of the Seventh International AAAI Conference of Weblogs and Social Media, ICWSM 2013, pp. 273-282.

Colbaugh, R., Glass, K., "Early Warning Analysis for Social Diffusion Events", IEEE International Conference on Intelligence and Security Informatics, (ISI), 2010, pp. 37-42.

Weng, J., Yao, Y., Leonardi, E., Lee, F., "Event Detection in Twitter", International Conference on Weblogs and Social Media, 2011, pp. 1-21.

Weerkamp, W., De Rijke, M., "Activity Prediction: A Twitter-based Exploration", SIGIR Workshop on Time-aware Information Access, 2012, pp. 1-4.

Xu, J., et al., "Civil Unrest Prediction: A Tumblr-Based Exploration," Social Computing, Behavioral-Cultural Modeling and Prediction Lecture Notes in Computer Science vol. 8393, 2014, pp. 403-411.

D. Jurgens, "That's what friends are for: Inferring location in online communities based on social relationships," ICWSM, Proceedings of the Seventh International AAAI Conference on Weblogs and Social Media, 2013, pp. 273-282.

H. Achrekar, A. Gandhe, R. Lazarus, S.-H. Yu, and B. Liu, "Predicting flu trends using twitter data," in Computer Communications Workshops (INFOCOM WKSHPS), 2011 IEEE Conference on. IEEE, 2011, pp. 702-707.

M. Paul and M. Dredze, "You are what you tweet: Analyzing twitter for public health," in Fifth international AAAI Conference on Weblogs and Social Media (ICWSM 2011), Proceedings of the Fifth International AAAI Conference on Weblogs and Social Media, 2011, pp. 265-272.

(56) References Cited

OTHER PUBLICATIONS

D. Mocanu, A. Baronchelli, N. Perra, B. Gonalves, Q. Zhang, and A. Vespignani, "The twitter of babel: Mapping world languages through microblogging platforms," PLoS One, vol. 8, No. 4, p. e61981, Apr. 2013.
A. Tumasjan, T. O. Sprenger, P. G. Sandner, and I. M. Welpe, "Predicting elections with twitter: What 140 characters reveal about political sentiment," in Proceedings of the fourth international AAAI conference on webiogs and social media, 2010, pp. 178-185.
R. Compton, C. Lee, T.-C. Lu, L. D. Silva, and M. Macy, "Detecting future social unrest in unprocessed twitter data," in IEEE Intelligence and Security Informatics (ISI), 2013, pp. 56-60.
B. Mandel, A. Culotta, J. Boulahanis, D. Stark, B. Lewis, and J. Rodrigue, "A demographic analysis of online sentiment during hurricane irene," in Proceedings of the Second Workshop on Language in Social Media. Association for Computational Linguistics, 2012, pp. 27-36.
h t p : / / thenextweb.com/2010/01/15/twitter-geofail-023-tweets-geotagged, taken on Nov. 4, 2014.
J. Mahmud, J. Nichols, and C. Drews, "Where is this tweet from? inferring home locations of twitter users," Proc AAAI ICWSM, Proceedings of the Sixth International AAAI Conference on Weblogs and Social Media. vol. 12, 2012, pp. 511-514.
Y. Takhteyev A. Gruzd, and B. Wellman, "Geography of twitter networks," Social Networks, vol. 34, No. 1, pp. 73-81, 2012.
D. Mok, B. Wellman, and J. Carrasco, "Does distance matter in the age of the internet?" Urban Studies, vol. 47, No. 13, pp. 2747-2783, 2010.
J. Goldenberg and M. Levy, "Distance is not dead: Social interaction and geographical distance in the internet era," arXiv preprint arXiv:0906.3202, 2009.
X. Bresson, T. Laurent, D. Uminsky, and J. H. von Brecht, "Convergence and energy landscape for cheeger cut clustering," Part of: Advances in Neural Information Processing Systems 25 (NIPS 2012), pp. 1394-1402.
A. Szlam and X. Bresson, "Total variation and cheeger cuts," Proceedings of the 27th International Conference on Machine Learning, pp. 1039-1046, 2010.
L. Rudin, S. Osher, and E. Fatemi, "Nonlinear total variation based noise removal algorithms," Physica D: Nonlinear Phenomena, vol. 60, No. 1-4, pp. 259-268, Nov. 1992.
Granovetter, Mark S. "The strength of weak ties." American journal of sociology (1973): 1360-1380.2.
Y. Vardi and C.-H. Zhang, "The multivariate l1-median and associated data depth," Proceedings of the National Academy of Sciences, vol. 97,No. 4, pp. 1423-1426, 2000.
E. Candes, J. Romberg, and T. Tao, "Stable Signal Recovery from Incomplete and Inaccurate Measurements arXiv : math / 0503066v2 [ math . NA ] Dec. 7, 2005," Science, vol. 40698, pp. 1-15, 2005.
A. Szlam and X. Bresson, "A total variation-based graph clustering algorithm for cheeger ratio cuts." Citeseer, 2010, (12 pages).
T. Goldstein and S. Osher, "The Split Bregman Method for L1-Regularized Problems," SIAM Journal on Imaging Sciences, Sciences, vol. 2, No. 2, pp. 323-343, 2009.
P. Getreuer, "Total Variation Inpainting using Split Bregman," Image Processing on Line, 2 (2012), pp. 147-157.
L. M. Smith, M. S. Keegan, T. Wittman, G. O. Mohler, and A. L. Bertozzi, "Improving density estimation by incorporating spatial information," EURASIP J. Adv. Signal Process, vol. 2010, pp. 7.1-7.12, Feb. 2010.
T. Goldstein, X. Bresson, and S. Osher, "Geometric Applications of the Split Bregman Method: Segmentation and Surface Reconstruction," Journal of Scientific Computing, vol. 45, No. 1-3, pp. 272-293, Nov. 2009.
A. Chambolle, "An algorithm for total variation minimization and applications," Journal of Mathematical imaging and vision, vol. 20, No. 1-2, pp. 89-97, 2004.
M. Zhu and T. Chan, "An efficient primal-dual hybrid gradient algorithm for total variation image restoration," UCLA CAM Report, pp. 08-34, 2008.

C.-J. Hsieh, K.-W. Chang, C.J. Lin, S. S. Keerthi, and S. Sundararajan, "A dual coordinate descent thod for large-scale linear svm," in Proceedings of the 25th international conference on Machine learning. ACM, 2008, pp. 408-415.
Y. Li and S. Osher, "Coordinate descent optimization for l1 minimization with application to compressed sensing: a greedy algorithm," Inverse Probl. Imaging, vol. 3, No. 3, pp. 487-503, 2009.
J. K. Bradley, A. Kyrola, D. Bickson, and C. Guestrin, "Parallel coordinate descent for l1-regularized loss minimization," in International Conference on Machine Learning (ICML 2011), Bellevue, Washington, Jun. 2011, arXiv:1105.5379.
P. Richt'arik and M. Tak'äc, "Parallel coordinate descent methods for big data optimization," arXiv:1212.0873, 2012.
C. Scherrer, A. Tewin, M. Halappanavar, and D. Haglin, "Feature clustering for accelerating parallel coordinate descent," Advances in Neural Information Processing Systems 25, pp. 28-36, arXiv:1212.4174, 2012.
P. Richt'arik and M. Tak'äc, "Efficient serial and parallel coordinate descent methods for huge-scale truss topology design," in Operations Research Proceedings 2011. Springer, 2012, pp. 27-32.
Rousseeuw, Peter J., and Christophe Croux. "Alternatives to the median absolute deviation." Journal of the American Statistical Association 88.424 (1993), pp. 1273-1283.
Ryan Compton, David Jurgens, David Allen, "Geotagging One Hundred Million Twitter Accounts with Total Variation Minimization," aiXiv preprint arXiv:1404.7152, (2014).
Office Action 1 for U.S. Appl. No. 14/210,265, dated Mar. 31, 2016.
Lars Backstrom et al., Find Me If You Can: Improving Geographical Prediction with Social and Spatial Proximity, Apr. 26-30, 2010, World Wide Web Conference Committee, 2010, p. 66.
Ciodoveu Davis Jr et al., Inferring the Location of Twitter Messages Based on User Relationships, Nov. 22, 2011, Transactions in GIS, 15, p. 741-744.
Response to Office Action 1 for U.S. Appl. No. 14/210,265, dated Jun. 30, 2016.
Office Action 2 for U.S. Appl. No. 14/210,265, dated Oct. 21, 2016.
Response to Office Action 2 for U.S. Appl. No. 14/210,265, dated Jan. 23, 2017.
Office Action 1 for U.S. Appl. No. 14/295,101, dated Sep. 7, 2016.
Abel et al., Semantics+ Filtering+ Search= Twitcident Exploring Information in Social Web Streams, 2012.
Response to Office Action 1 for U.S. Appl. No. 14/295,101, dated Dec. 7, 2016.
K. Leetaru and P. Schrodt, "GDELT: Global data on events, location, and tone, 1979-2012," Pap. Present., International Studies Association, ISA, pp. 1979-2012, 2013.
M. T. Malik, A. Gumel, L. H. Thompson, T. Strome, and S. M. Mahmud, "'Google Flu Trends' and Emergency Department Triage Data Predicted the 2009 Pandemic H1N1 Waves in Manitoba," Canadian Journal of Public Health, vol. 102, issue No. 4, pp. 294-297, 2011.
F. Pervaiz, M. Pervaiz, N. Abdur Rehman, and U. Saif, "FluBreaks: early epidemic detection from Google flu trends," J. Med. Internet Res., vol. 14, No. 5, pp. e125-1-e125-16, Jan. 2012.
S. P. O'Brien, "Crisis Early Warning and Decision Support: Contemporary Approaches and Thoughts on Future Research," Defense Advanced Research Projects Agency International Studies Review (Impact Factor: 0.74), 12(1): pp. 87-104, 2010.
6. M. D. Ward, A. Beger, J. Cutler, C. Dorff, and B. Radford, "Comparing GDELT and ICEWS Event Data," vol. 1, pp. 1-10, 2013, Wardlab.
Ward, Michael D et al. 2012. "Geographical Models of Crises: Evidence from ICEWS". In Advances in Design for Cross-Cultural Activities, Part I, Advances in Design for Cross-Cultural Activities, Part I, Dylan D Schmorrow and Denise M Nicholson. Boca Raton, FL: CRC Press, pp. 429-438.
P. A. Grabowicz and V. M. Eguiluz, "Heterogeneity shapes groups growth in social online communities," EPL Europhysics Lett., vol. 97, No. 2, pp. 28002-p. 1-28002-p. 5, 2012.
D. Braha, "Global civil unrest: contagion, self-organization, and prediction," PLoS One, vol. 7, No. 10, pp. e48596-1-e48596-9, Jan. 2012.

(56) References Cited

OTHER PUBLICATIONS

H. Becker, M. Naaman, and L. Gravano, "Beyond Trending Topics: Real-World Event Identification on Twitter," International Conference on Web and Social Media, ICWSM, pp. 1-17, 2011.
A. Zubiaga, D. Spina, and R. Martinez, "Classifying Trending Topics☐: A Typology of Conversation Triggers on Twitter," Evaluation. pp. 8-11, 2011.
J. Story, M. Hall, and J. Wickstra, "Discovering Trending Topics on Twitter via Retweets," Computer (Long. Beach. Calif), 2011, pp. 1-6.
N. Pervin, F. Fang, A. Datta, K. Dutta, and D. Vandermeer, "Fast, Scalable, and Context-Sensitive Detection of Trending Topics in Microblog Post Streams," ACM Trans. Manag. Inf. Syst., vol. 3, pp. 1-24, 2013.
L. Aiello, G. Petkos, and C. Martin, "Sensing trending topics in Twitter," IEEE Transactions on Multimedia, vol. 15, No. 6, pp. 1268-1282, 2013.
D. Wilkinson and M. Thelwall, "Trending Twitter topics in English: An international comparison," J. Am. Soc. Inf. Sci. Technol., vol. 63, pp. 1631-1646, 2012.
L. Hong, A. Ahmed, S. Gurumurthy, A. J. Smola, and K. Tsioutsiouliklis, "Discovering geographical topics in the Twitter stream," Proc. 21st Int. Conf. World Wide Web—WWW '12, pp. 769-779, 2012.
D. Jurgens, "That's What Friends Are For☐: Inferring Location in Online Social Media Platforms Based on Social Relationships," in Proceedings of the Seventh International AAAI Conference on Weblogs and Social Media That's, 2013, pp. 273-282.
L. Hongi, A. Ahmed, and S. Gurumurthy, "Discovering geographical topics in the Twitter stream," in Proceedings of the 21st international conference on World Wide Web, pp. 769-778, 2012.
M. Krstajic, C. Rohrdantz, M. Hund, and A. Weiler, "Getting there first: real-time detection of real-world incidents on Twitter," in 2nd Workshop on Interactive Visual Text Analytics: Task-Driven Analysis of Social Media Content with Visweek'12, 2012, pp. 2-5.
T. Kraft, D. X. Wang, J. Delawder, W. Dou, and W. Ribarsky, "Less After-the-Fact: Investigative visual analysis of events from streaming Twitter," 2013 IEEE Symp. Large-Scale Data Anal. Vis., pp. 95-103, Oct. 2013.
S. Ardon, A. Bagchi, A. Mahanti, A. Ruhela, A. Seth, R. M. Tripathy, and S. Triukose, "Spatio-temporal and events based analysis of topic popularity in Twitter," in Proceedings of the 22nd ACM international conference on Conference on information & knowledge management, 2013, pp. 219-228.
R. Compton, C. Lee, J. Xu, L. Artieda-moncada, T. Lu, L. De Silva, and M. Macy, "Using publicly visible social media to build detailed forecasts of civil unrest." Security Informatics, pp. 1-11, 2013.
Manrique, H. Qi, A. Morgenstern, N. Velasquez, T.-C. Lu, and N. Johnson, "Context matters: Improving the uses of big data for forecasting civil unrest: Emerging phenomena and big data," 2013 IEEE International Conference on Intelligence and Security Informatics. IEEE, pp. 169-172, Jun. 2013.
C. A. A. Beauchemin and A. Handel, "A review of mathematical models of influenza A infections within a host or cell culture: lessons learned and challenges ahead," BMC Public Health, vol. 11, No. suppl 1, pp. S7-1-S7-15, 2011.
E. O. Nsoesie, R. J. Beckman, S. Shashaani, K. S. Nagaraj, and M. V Marathe, "A Simulation Optimization Approach to Epidemic Forecasting.," PLoS One, vol. 8, No. 6, pp. e67164-1-e67164-10, Jan. 2013.
L. N. Murillo, M. S. Murillo, and A. S. Perelson, "Towards multiscale modeling of influenza infection," J. Theor. Biol., vol. 332, pp. 267-290, Sep. 2013.
J. Ginsberg, M. H. Mohebbi, R. S. Patel, L. Brammer, M. S. Smolinski, and L. Brilliant, "Detecting influenza epidemics using search engine query data," Nature, vol. 457, No. 7232, pp. 1012-1015, 2009.
H. A. Cameiro and E. Mylonakis, "Google Trends: A Web-Based Tool for Real-Time Surveillance of Disease Outbreaks," Clin. Infect. Dis., vol. 49, No. 10, pp. 1557-1564, 2009.
A. F. Dugas, et al. "Influenza Forecasting with Google Flu Trends." (2013) PLoS One 8(2): pp. e56176-1-e56176-7. doi:10.1371/journal.pone.0056176.
M. Kang, H. Zhong, J. He, S. Rutherford, and F. Yang, "Using Google Trends for Influenza Surveillance in South China," PLoS One, vol. 8, No. 1, 2013, pp. e55205-1-e55205-6.
X. Zhou, Q. Li, Z. Zhu, and H. Zhao, "Monitoring Epidemic Alert Levels by Analyzing Internet Search Volume," IEEE Trans. Biomed. Eng., vol. 60, No. 2, pp. 446-452, 2013.
K. Wilson and J. S. Brownstein, "Early detection of disease outbreaks using the Internet," CMAJ, vol. 180, No. 8, pp. 829-831, Apr. 2009.
B. M. Althouse, Y. Y. Ng, and D. A. T. Cummings, "Prediction of Dengue Incidence Using Search Query Surveillance," PLoS Negl. Trop. Dis., vol. 5, No. 8, pp. e1258-1-e1258-7, 2011.
P. M. Polgreen, Y. Chen, D. M. Pennock, and F. D. Nelson, "Using internet searches for influenza surveillance," Clin. Infect. Dis., vol. 47, No. 11, pp. 1443-1148, Dec. 2008.
A. Hulth and G. Rydevik, "Get Well: an automated surveillance system for gaining new epidemiological knowledge," BMC Public Health, vol. 11, 2011, pp. 252-1-252-8.
L. Samaras, E. García-Barriocanal, and M.-A. Sicilia, "Syndromic surveillance models using Web data: the case of scarlet fever in the UK," Inform. Health Soc. Care, vol. 37, No. 2, pp. 106-124, Mar. 2012.
X. Zhou, J. Ye, and Y. Feng, "Tuberculosis surveillance by analyzing Google trends," IEEE Trans. Biomed. Eng., vol. 58, No. 8, pp. 2247-2254, Aug. 2011.
Office Action 2 for U.S. Appl. No. 14/295,101, dated Feb. 16, 2017.
Response to Office Action 2 for U.S. Appl. No. 14/295,101, dated May 16, 2017.
Office Action 3 for U.S. Appl. No. 14/295,101, dated Jul. 10, 2017.
Communication regarding European Search Report and the European Search Opinion for European Regional Phase Patent Application No. 14780262.3, dated Oct. 13, 2016.
Search strategy in the European Search for European Regional Phase Patent Application No. 14780262.3, dated Oct. 13, 2016.
Search Report in the European Search for European Regional Phase Patent Application No. 14780262.3, dated Oct. 13, 2016.
Lars Backstrom et al: "Find me if you can," Proceedings of the 19th International Conference on World Wide Web. WWW '10. Jan. 1, 2010 (Jan. 1, 2010). XP055188728. New York. New York. USA, pp. 61-69.
Tatiana Pontes et al: "Beware of What You Share: Inferring Home Location in Social Networks." Data Mining Workshops (ICDMW). 2012 IEEE 12th International Conference on. IEEE Dec. 10, 2012 (Dec. 10, 2012). pp. 571-578. XP032303104.
Clodoveu A. Davis Jr. et al: "Inferring the Location of Twitter Messages Based on User Relationships." Transactions in GIS. vol. 15. No. 6. Dec. 22, 2011 (Dec. 22, 2011). pp. 735-751. XP055305589. GB.
David Jurgens: "That's What Friends Are for: Inferring Location in Online Social Media Platforms Based on Social Relationships," Jun. 27, 2013 (Jun. 27, 2013). pp. 273-282. XP055307355. Retrieved from the Internet: URL:http://www.aaai.orgjdocsjindex.php/ICWSM/ICWSM13/paperjviewFile/6067/6366 [retrieved on Oct. 4, 2016].
Cheng, Z., et al., "You are where you tweet: a content-based approach to geo-locating twitter users," In Proceedings of the 19th ACM international conference on Information and knowledge management, 2010, pp. 759-768.
Notice of Allowance for U.S. Appl. No. 14/210,265, dated Jun. 8, 2017.
Office Action for Chinese Application No. 201480020049.1, dated May 12, 2017.
Response to the European Search Report and the European Search Opinion for European Regional Phase Patent Application No. 14780262.3, dated Aug. 29, 2017.
International Preliminary Report on Patentability for PCT/US2014/026846; dated Oct. 15, 2015.
Response to Office Action 3 for U.S. Appl. No. 14/295,101, dated Oct. 10, 2017.
Office Action 1 for Chinese Application No. 201480020049.1, dated May 12, 2017.

(56) References Cited

OTHER PUBLICATIONS

Response to Office Action 1 for Chinese Application No. 201480020049.1, dated Sep. 4, 2017.
Notice of Allowance for Chinese Application No. 201480020049.1, dated Oct. 30, 2017.
Notice of Allowance for U.S. Appl. No. 14/295,101, dated Dec. 18, 2017.
Further brief Examination Report for European Regional Phase Patent Application No. 14780262.3, dated Nov. 12, 2018.
Response to the Examination Report for European Regional Phase Patent Application No. 14780262.3, dated Aug. 23, 2019.
Office Action 1 for U.S. Appl. No. 14/535,812, dated May 25, 2017.
Boettcher, "EventRadar: A Real-Time Local Event Detection Scheme Using Twitter Stream," 2012.
Watanabe, "Jasmine: A Real-time Local-event Detection System based on Feolocation Information Propagated to Microblogs," 2011.
Response to Office Action 1 for U.S. Appl. No. 14/535,812, dated Aug. 22, 2017.
Office Action 2 for U.S. Appl. No. 14/535,812, dated Oct. 27, 2017.
Response to Office Action 2 for U.S. Appl. No. 14/535,812, dated Jan. 29, 2018.
Office Action 3 for U.S. Appl. No. 14/535,812, dated Aug. 3, 2018.
Response to Office Action 3 for U.S. Appl. No. 14/535,812, dated Oct. 31, 2018.
Notice of Allowance for U.S. Appl. No. 14/535,812, dated Dec. 5, 2018.
Office Action 1 for U.S. Appl. No. 14/693,640, dated May 3, 2017.
Response to Office Action 1 for U.S. Appl. No. 14/693,640, dated Jul. 24, 2017.
Office Action 2 for U.S. Appl. No. 14/693,640, dated Oct. 23, 2017.
Response to Office Action 2 for U.S. Appl. No. 14/693,640, dated Jan. 9, 2018.
Office Action 3 for U.S. Appl. No. 14/693,640, dated May 22, 2018.
Notice of Abandonment for U.S. Appl. No. 14/693,640, dated Jan. 31, 2019.
Office Action 1 for U.S. Appl. No. 15/163,547, dated May 18, 2017.
Scott, Steven L., et al., "Predicting the present with bayesian structural time series," Jun. 28, 2013 <http://dx.doi.org/10.2139/ssm.2304426>.
Response to Office Action 1 for U.S. Appl. No. 15/163,547, dated Aug. 14, 2017.
Notice of Allowance for U.S. Appl. No. 15/163,547, dated Oct. 5, 2017.

* cited by examiner

PER-USER ACCURACY MEASURE FOR SOCIAL NETWORK BASED GEOCODING ALGORITHMS

CROSS-REFERENCE TO RELATED APPLICATIONS

This is a Continuation-in-Part application of U.S. Non-Provisional application Ser. No. 14/295,101, filed in the United States on Jun. 3, 2014, entitled, "Social Media Data Mining for Early Detection of Newsworthy Civil Unrest Events."

U.S. Non-Provisional application Ser. No. 14/295,101 is a Continuation-in-Part application of U.S. Non-Provisional application Ser. No. 14/210,265, filed in the United States on Mar. 13, 2014, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis."

U.S. Non-Provisional application Ser. No. 14/295,101 is also a Non-Provisional patent application of U.S. Provisional Application No. 61/831,058, filed in the United States on Jun. 4, 2013, entitled, "Social Media Data Mining for Early Detection of Newsworthy Civil Unrest Events."

This is ALSO a Continuation-in-Part application of U.S. Non-Provisional application Ser. No. 14/210,265, filed in the United States on Mar. 13, 2013, entitled, "Inferring the Location of Users in Online Social Media Platforms Using Social Network Analysis," which is a Non-Provisional patent application of U.S. Provisional Application No. 61/809,160, filed in the United States on Apr. 5, 2013, entitled, "Inferring the Location of Users in Online Social Media Platforms Using Social Network Analysis."

This is ALSO a Non-Provisional Application of U.S. Provisional Application No. 61/903,618, filed in the United States on Nov. 13, 2013, entitled, "Per-User Accuracy Measure for Social Network Based Geocoding Algorithms."

GOVERNMENT LICENSE RIGHTS

This invention was made with government support under U.S. Government Contract Number D12PC00285. The government has certain rights in the invention.

FIELD OF INVENTION

The present invention relates to a system for geocoding social networks and, more particularly, to a system for geocoding social networks by minimizing total variation.

BACKGROUND OF THE INVENTION

Annotating social media with geographic information is essential for modern information retrieval. The ability to geospatially index a large volume of social media (e.g., Twitter™) data is valuable for several emerging research directions. Indeed, social media analytics have proven useful for understanding regional flu trends (see the List of Incorporated Cited Literature References, Literature Reference Nos. 2 and 3), linguistic patterns (as described in Literature Reference No. 4), elections (as described in Literature Reference No. 5), social unrest (as described in Literature Reference No. 6), and disaster response (as described in Literature Reference No. 7). These approaches, however, depend on the physical locations of Twitter™ users, which are only sparsely available in public data.

Complex natural language processing techniques may bring the fraction of geocodable users higher, but they are language dependent and require computationally expensive training steps which have not been tested at scale (see Literature Reference No. 9). Further, recent work in the social sciences has established that online social ties are often made over short geographic distances (as described in Literature Reference Nos. 10, 11, and 12). Because of this, it is possible to infer the location of a social media (e.g., Twitter™) user by examining the locations of their online contacts.

Previous work on geocoding online social network participants has focused on coverage and global error estimates. Thus, a continuing need exists for providing a per-user error estimate, making it possible to discard location estimates when the expected error is large.

SUMMARY OF THE INVENTION

The present invention relates to a system for geocoding social networks and, more particularly, to a system for geocoding social networks by minimizing total variation. The system comprises one or more processors and a memory having instructions such that when the instructions are executed, the one or more processors perform multiple operations. The system receives a set of social media data from a social media platform having users. A social network is generated from the set of social media data based on communication between users. A ground truth set of locations is determined for users who make their locations public, and the ground truth set of locations is propagated across the social network to generate a location estimate for each user. Finally, a confidence measure is generated for each location estimate.

In another aspect, the ground truth set of location is propagated by employing a parallel coordinate descent technique to solve a globally-defined total variation-based optimization problem.

In another aspect, the globally-defined total variation-based optimization problem is as follows:

$$\min_f |\nabla f| \text{ subject to } f_i = l_i \text{ for } i \in L,$$

where $f$ encodes a location estimate for each user i, L denotes a set of users who make their locations, $l_j$, public, and the total variation is defined by:

$$|\nabla f| = \sum_{ij} w_{ij} d(f_i, f_j),$$

where d represents the geodesic distance between user i and user j, and edge weights $w_{ij}$ denote graph connectivity between user i and user j in the social network.

In another aspect, the confidence measure is determined according to the following:

$$\tilde{\nabla} f_i = \text{median}_j (d(f_i, f_j))$$

where $\tilde{\nabla} f_i$ is the median absolute deviation of a set of location estimates for a user's contacts.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
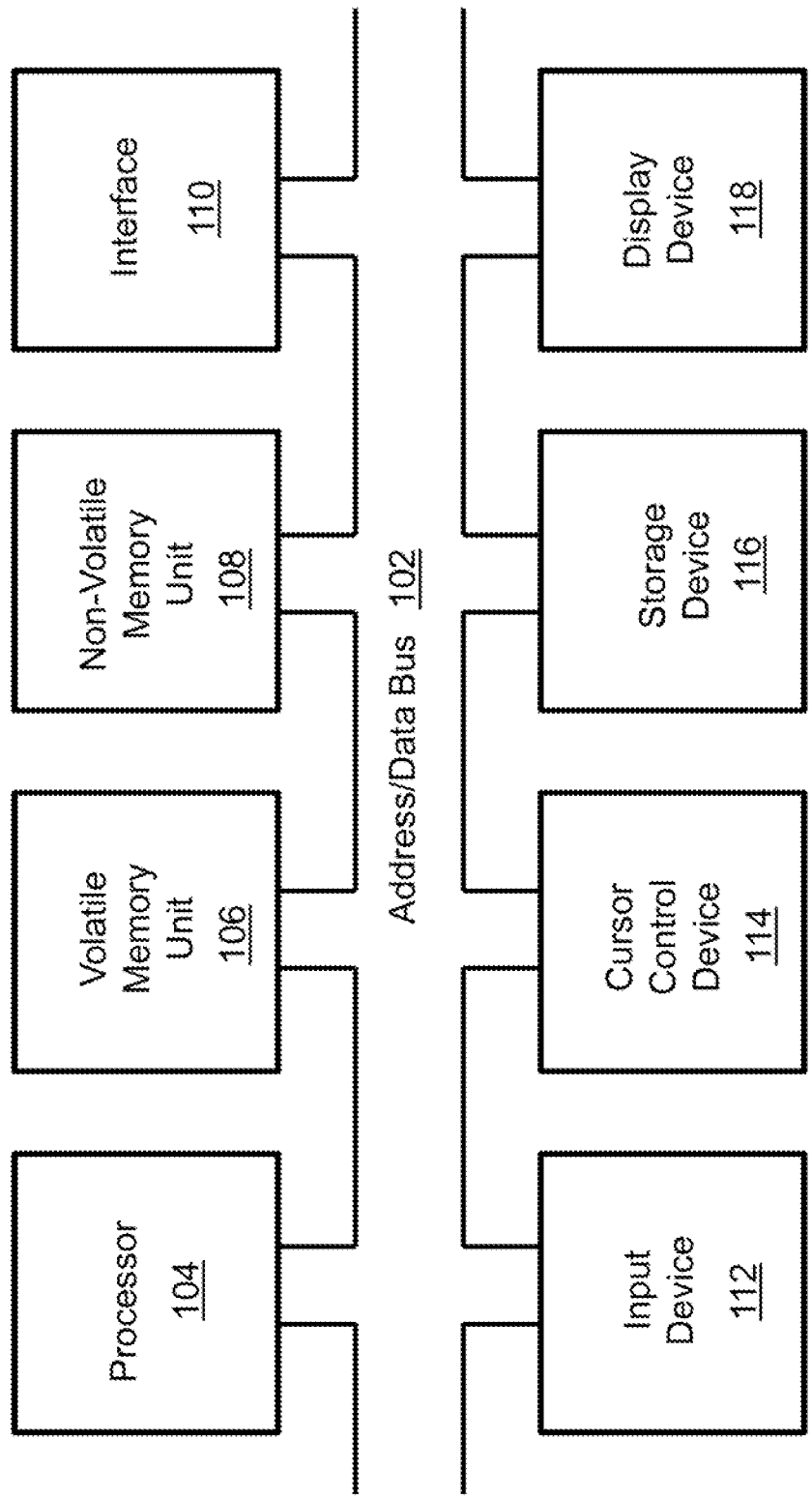
FIG. 1 is a block diagram depicting the components of a system for geocoding social networks according to the principles of the present invention.

The present invention relates to a system for geocoding social networks and, more particularly, to a system for geocoding social networks by minimizing total variation. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED CITED LITERATURE REFERENCES

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. D. Jurgens, "That's what friends are for: Inferring location in online communities based on social relationships," ICWSM, 2013.
2. H. Achrekar, A. Gandhe, R. Lazarus, S.-H. Yu, and B. Liu, "Predicting flu trends using twitter data," in Computer Communications Workshops (INFOCOM WKSHPS), 2011 IEEE Conference on. IEEE, 2011, pp. 702-707.
3. M. Paul and M. Dredze, "You are what you tweet: Analyzing twitter for public health," in Fifth International AAAI Conference on Weblogs and Social Media (ICWSM 2011), 2011.
4. D. Mocanu, A. Baronchelli, N. Perra, B. Gonalves, Q. Zhang, and A. Vespignani, "The twitter of babel: Mapping world languages through microblogging platforms," PLoS ONE, vol. 8, no. 4, p. e61981, 04 2013.
5. A. Tumasjan, T. O. Sprenger, P. G. Sandner, and I. M. Welpe, "Predicting elections with twitter: What 140 characters reveal about political sentiment," in Proceedings of the fourth international AAAI conference on weblogs and social media, 2010, pp. 178-185.
6. R. Compton, C. Lee, T.-C. Lu, L. D. Silva, and M. Macy, "Detecting future social unrest in unprocessed twitter data," in IEEE Intelligence and Security Informatics (ISI), 2013.
7. B. Mandel, A. Culotta, J. Boulahanis, D. Stark, B. Lewis, and J. Rodrigue, "A demographic analysis of online sentiment during hurricane irene," in Proceedings of the Second Workshop on Language in Social Media. Association for Computational Linguistics, 2012, pp. 27-36.
8. http://thenextweb.com/2010/01/15/Twitter-geofail-023-tweets-geotagged, taken on Nov. 4, 2014.
9. J. Mahmud, J. Nichols, and C. Drews, "Where is this tweet from?inferring home locations of twitter users," Proc AAAI ICWSM, vol. 12, 2012.

10. Y. Takhteyev, A. Gruzd, and B. Wellman, "Geography of twitter networks," Social Networks, vol. 34, no. 1, pp. 73-81, 2012.

11. D. Mok, B. Wellman, and J. Carrasco, "Does distance matter in the age of the internet?" Urban Studies, vol. 47, no. 13, pp. 2747-2783, 2010.

12. J. Goldenberg and M. Levy, "Distance is not dead: Social interaction and geographical distance in the internet era," arXiv preprint arXiv:0906.3202, 2009.

13. http://www.geodesy.org, taken on Nov. 4, 2014.

14. X. Bresson, T. Laurent, D. Uminsky, and J. H. von Brecht, "Convergence and energy landscape for cheeger cut clustering," 2012.

15. A. Szlam and X. Bresson, "Total variation and cheeger cuts," Proceedings of the 27th International Conference on Machine Learning, pp. 1039-1046, 2010.

16. L. Rudin, S. Osher, and E. Fatemi, "Nonlinear total variation based noise removal algorithms," Physica D: Nonlinear Phenomena, vol. 60, no. 1-4, pp. 259-268, November 1992.

17. Granovetter, Mark S. "The strength of weak ties." American journal of sociology (1973): 1360-1380.2.

18. http://gnip.com/twitter/decahose/, taken on Nov. 4, 2014.

19. http://snap.stanford.eduisnap/index.html, taken on Nov. 4, 2014.

20. Y. Vardi and C.-H. Zhang, "The multivariate l1-median and associated data depth," Proceedings of the National Academy of Sciences, vol.

97, no. 4, pp. 1423-1426, 2000.

21. http://www.geonames.org/, taken on Nov. 4, 2014.

22. E. Candes, J. Romberg, and T. Tao, "Stable Signal Recovery from Incomplete and Inaccurate Measurements arXiv: math/0503066v2 [math. NA] 7 Dec. 2005," Science, vol. 40698, pp. 1-15, 2005.

23. "Stable Signal Recovery from Incomplete and Inaccurate Measurements," arXiv:math/0503066v2 [math. NA] 7 Dec. 2005, vol. 40698, pp. 1-15, 2005.

24. A. Szlam and X. Bresson, A total variation-based graph clustering algorithm for cheeger ratio cuts. Citeseer, 2010.

25. T. Goldstein and S. Osher, "The Split Bregman Method for L1-Regularized Problems," SIAM Journal on Imaging Sciences, vol. 2, no. 2, p. 323, 2009.

26. P. Getreuer, "Total Variation Inpainting using Split Bregman," Image Processing On Line, vol. 2012, 2012.

27. L. M. Smith, M. S. Keegan, T. Wittman, G. O. Mohler, and A. L. Bertozzi, "Improving density estimation by incorporating spatial information," EURASIP J. Adv. Signal Process, vol. 2010, pp. 7:1-7:12, February 2010.

28. T. Goldstein, X. Bresson, and S. Osher, "Geometric Applications of the Split Bregman Method: Segmentation and Surface Reconstruction," Journal of Scientific Computing, vol. 45, no. 1-3, pp. 272-293, November 2009.

29. A. Chambolle, "An algorithm for total variation minimization and applications," Journal of Mathematical imaging and vision, vol. 20, no. 1-2, pp. 89-97, 2004.

30. M. Zhu and T. Chan, "An efficient primal-dual hybrid gradient algorithm for total variation image restoration," UCLA CAM Report, pp. 08-34, 2008.

31. C.-J. Hsieh, K.-W. Chang, C.-J. Lin, S. S. Keerthi, and S. Sundararajan, "A dual coordinate descent method for large-scale linear svm," in Proceedings of the 25th international conference on Machine learning. ACM, 2008, pp. 408-415.

32. Y. Li and S. Osher, "Coordinate descent optimization for l minimization with application to compressed sensing; a greedy algorithm," Inverse Probl. Imaging, vol. 3, no. 3, pp. 487-503, 2009.

33. J. K. Bradley, A. Kyrola, D. Bickson, and C. Guestrin, "Parallel coordinate descent for l1-regularized loss minimization," in International Conference on Machine Learning (ICML 2011), Bellevue, Wash., June 2011.

34. P. Richt´arik and M. Takˇaˇc, "Parallel coordinate descent methods for big data optimization," arXiv preprint arXiv:1212.0873, 2012.

35. C. Scherrer, A. Tewari, M. Halappanavar, and D. Haglin, "Feature clustering for accelerating parallel coordinate descent," arXiv preprint arXiv:1212.4174, 2012.

36. P. Richt´ arik and M. Takˇ aˇc, "Efficient serial and parallel coordinate descent methods for huge-scale truss topology design," in Operations Research Proceedings 2011. Springer, 2012, pp. 27-32.

37. Rousseeuw, Peter J., and Christophe Croux. "Alternatives to the median absolute deviation." Journal of the American Statistical Association 88.424 (1993): 1273-1283.

38. https://blogtwitter.com/2013/geography-tweets-3, taken on Nov. 4, 2014.

The present invention has three "principal" aspects. The first is a system for geocoding social networks. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.)

coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
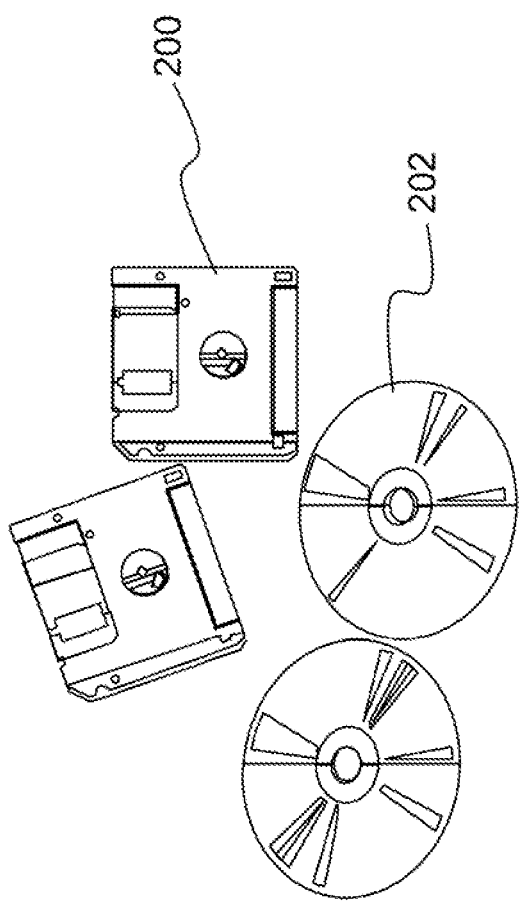
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The ability to geospatially index a large volume of social media (e.g., Twitter™) data is valuable for several emerging research directions. Recent work in the social sciences has established that online social ties are often made over short geographic distances (see Literature Reference Nos. 10, 11, and 12). Because of this, it is possible to infer the location of a social media user by examining the locations of their online contacts. Indeed, this is the approach taken in Literature Reference No. 1, where the author developed a process referred to as "Spatial Label Propagation" which iteratively estimates users' locations by propagating the locations of global positioning system (GPS)-known users across an appropriately chosen Twitter™ @mention network.

In the system according to the principles of the present invention, Spatial Label Propagation is interpreted as a coordinate descent method applied to the linearly-constrained geodesically-convex optimization as follows:

$$\min_f |\nabla f| \text{ subject to } f_i = l_i \text{ for } i \in L, \quad (1)$$

where $f$ encodes a location estimate for each user, $\nabla$ denotes a gradient, $L$ denotes the set of users who opt to make their locations, $l_i$, public, and the total variation on the @mention network is defined by:

$$|\nabla f| = \sum_{ij} w_{ij} d(f_i, f_j), \quad (2)$$

where the geodesic distance, d, is computed with Vincenty's formulae (see Literature Reference No. 13 for a description of Vicenty's formulae), and the edge weights $w_{ij}$ encode graph topology. This interpretation of Spatial Label Propagation according to the principles of the present invention bridges a gap between the social network geocoding problem and a well-established body of work in transductive learning (as described in Literature References No. 14 and 15) and image processing (as described in Literature Reference No. 16).

As will be described in detail below, the system according to the principles of the present invention performs better when a user's contacts are tightly clustered nearby. This fact was used to develop a technique which allows one to estimate per-node accuracy. Specifically, it will be shown that the median of each user's distance to their contacts:

$$\tilde{\nabla} f_i = \text{median}_j(d(f_i, f_j)) \quad (3)$$

agrees well with geocoder error and, thus, provides a point-wise confidence measure which can be applied to each node in the @mention network.

(4) SPECIFIC DETAILS OF THE INVENTION

(4.1) Network Construction
(4.1.1) Social Graph

An appropriate social graph is a fundamental part of the system according to the principles of the present invention. While the invention described herein is applicable to a variety of social media platforms, Twitter™ is used for illustrative purposes only. Thus, although the term Twitter™ (or other terms related to Twitter™) may be used, it should be understood that the invention is not intended to be limited thereto, as any other appropriate platform can be used interchangeably in place of the Twitter™ social media platform. Twitter™ users often "@mention" each other by appending an "@" to the mentioned user's name. After collecting social media data, a social graph G=(V,E) was built with users as vertices and edges defined by @mentions between users.

Reciprocated @mentions indicate social ties. Edges of $G^b$, the "bidirectional @mention graph" were defined by:

$$w_{ij}^b = \begin{cases} 1 & \text{if } i \text{ mentioned } j \text{ an } j \text{ mentioned } i \\ 0 & \text{otherwise} \end{cases}$$

Social ties are stronger when a mutual friend is present, as described in Literature Reference No. 17. By removing edges from the bidirectional @mention graph which were not part of a closed triangle (representing a set of three connected nodes), $G^t$, the "triadic @mention graph" was formed with edges defined by:

$$w_{ij}^t = \begin{cases} w_{ij}^b & \text{if } i \text{ and } j \text{ have a mutual friend in } G^b \\ 0 & \text{otherwise} \end{cases}$$

The key advantage to constructing a social graph from @mentions (as opposed to "followers" or "favorites") is that it enables one to build a large social graph from a large collection of Tweets™ without being burdened by Twitter™ application programming interface (API) rate limiting.

A first graph was built from a 10% sample of Twitter™ taken between Apr. 11, 2012 and Jun. 2, 2013 (from Literature Reference No. 18). This amounted to 39.6 terabytes (TB) of JSON (JavaScript Object Notation) data (uncompressed) and 13,648,995,732 (@mentions. The resulting bidirectional @mention graph bad 619,348,255 edges and 77,632,636 nodes. The corresponding triadic @mention graph had 472,948,551 edges and 46,086,358 users.

A second graph was built from a different 10% sample of Twitter™ collected between Jul. 1, 2012 and Dec. 31, 2012. 642,131,874 @mentions were present in this stream. The resulting bidirectional @mention graph had 205,533,280 edges and 44,519,964 users. The corresponding triadic @mention graph had 134,090,103 edges and 23,503,848 users.

By sampling @mentions from both data streams, a bidirectional @ mention graph consisting of 708,646,606 edges and 81,719,592 users was generated. The corresponding triadic @mention graph consists of 548,633,121 edges and 49,157,377 users. This triadic @mention graph was used in the optimization according to the principles of the present invention, which will be described in detail below. The decision to use the triadic @mention graph was motivated by work described in Literature Reference No. 1, where it was shown that the median error is reduced when the graph is restricted to triadic closures.

(4.1.2) Ground Truth User Locations

To convert the social graph into a social network (graphs with data on nodes), a function, $f$, was defined which assigns to each user of the social media platform an estimate of their physical location. Users may opt to make their location publicly available through cellphone-enabled GPS or self-reported profile information. For this small set of users, computation of $f$ is relatively straightforward.

To assign a unique location to a user from the set of their GPS-tagged Tweets™, $\mathcal{G}$, the l1-multivariate median (see Literature Reference No. 20 for a description of the l1-multivariate median) of the locations the user has tweeted from is determined according to the following:

$$\underset{x}{\operatorname{argmin}} \sum_{y \in \mathcal{G}} d(x, y), \quad (4)$$

where d is Vincenty's distance, y is a member of $\mathcal{G}$, and x is the minimization variable.

Users who had not tweeted more than three times from inside the same 20 kilometer (km) radius were filtered out. This left a set of 6,132,735 users whose location was known via GPS. Following this, self-reported home locations were extracted by searching through a list of 51,483 unambiguous location names for exact matches in user profiles. When self-reporting users also reveal their location through GPS, there is a preference for using the GPS-known location. This provided home locations for an additional 17,665,658 users.

The list of 51,483 location names was optimized for accuracy on Twitter™. Starting with an initial list of 67,711 location names obtained from the GeoNames project (see Literature Reference No. 21 for the GeoNames project), 12,471,920 Tweets™ with GPS tags from users who self-reported profile locations were examined, and location names were removed from the list when the median discrepancy between GPS and the reported location was greater than 100 km. The total number of users with ground truth locations via GPS or self-reports was 23,798,393. This set of users was denoted by L, and the remaining users in the network were denoted by U. The vertex set is, thus, positioned as:

$$V = L + U, \quad (5)$$

and the goal was to assign a value of $f$ to nodes in U, or the remaining users in the network without ground truth location or self-reports.

(4.2) Location Inference (4.2.1) Global Optimization Problem

The system according to the principles of the present invention assigns a location to a user based on the locations of their contacts. To check that online social ties are well-aligned with geographic distance, attention was restricted to GPS-known users, and the contact patterns between them was studied. Users with GPS-known locations make up only a tiny portion of the @mention networks according to the principles of the present invention. Despite this, online ties typically form between users who live near each other, and a majority of GPS-known users have at least one GPS-known friend within 10 km. In light of this, it is desirable to have a network such that the sum over all geographic distances between connected users is as small as possible. This quantity, known as total variation, is defined in equation (2) described above. The total variation functional is nondifferentiable. Solving a total variation-based optimization is, thus, a formidable challenge and vastly different methods have been proposed for decades, such as those described in Literature Reference Nos. 28, 29, 30, 31, and 32.

Therefore, "parallel coordinate descent" (described in Literature Reference No. 36) was used to solve equation (1). Most variants of coordinate descent cycle through the domain sequentially, updating each variable and communicating back the result before the next variable can update. However, the scale of the data necessitates a parallel approach. This prohibits one from making all of the communication steps required by a traditional coordinate descent method. At each iteration, the system according to the principles of the present invention simultaneously updates each node with the l1-multivariate median of the neighboring nodes' (users') location. Only after all updates are complete are the results communicated over the network. At iteration k, the user estimates are denoted by $f^k$, and the variation on the ith node by:

$$|\nabla_i(f^k, f)| = \sum_j w_{ij} d(f, f_j^k). \quad (6)$$

Parallel coordinate descent for constrained total variation (TV) minimization is stated concisely as follows:

Initialize: $f_i = l_i$ for $i \in L$
while not converged do
  parfor i:
    if $i \in L$ then
      $f_i^{k+1} = l_i$
    else
      $f_i^{k+1} = \arg\min_f |\nabla_i(f^k, f)|$
    end
  end parfor
  $f^k = f^{k+1}$
end.

The argument that minimizes equation (6) is the l1-multivariate median of the locations of the neighbors of node i. With this computation inside the parfor of the process above, the Spatial Label Propagation of Literature Reference No. 1 was reproduced as a coordinate descent method designed to minimize total variation.

(4.2.2) Individual Error Estimation

While the vast majority of Twitter™ users @mention with geographically close users, there remains a non-empty collection of users who exclusively maintain long-distance relationships or have amassed a large number of contacts. A robust estimate of the dispersion of each user's contacts were used to infer the accuracy of the geocoding process according to the principles of the present invention. The estimate for the error on user i is the "median absolute deviation" (see Literature Reference No. 37 for a description of the median absolute deviation) of the inferred locations of user i's contacts as follows:

$$\nabla \tilde{f}_i = \mathrm{median}_j \left( w_{ij} d \left( f_j, \arg\min_f |\nabla_i f^k, f)| \right) \right) \quad (7)$$

$$= \mathrm{median}_j(d(f_i, f_j)). \quad (8)$$

Thus, to provide an estimate of geocoding accuracy for user i, the median of the distances between user i and their contacts was taken.

Figure 3:
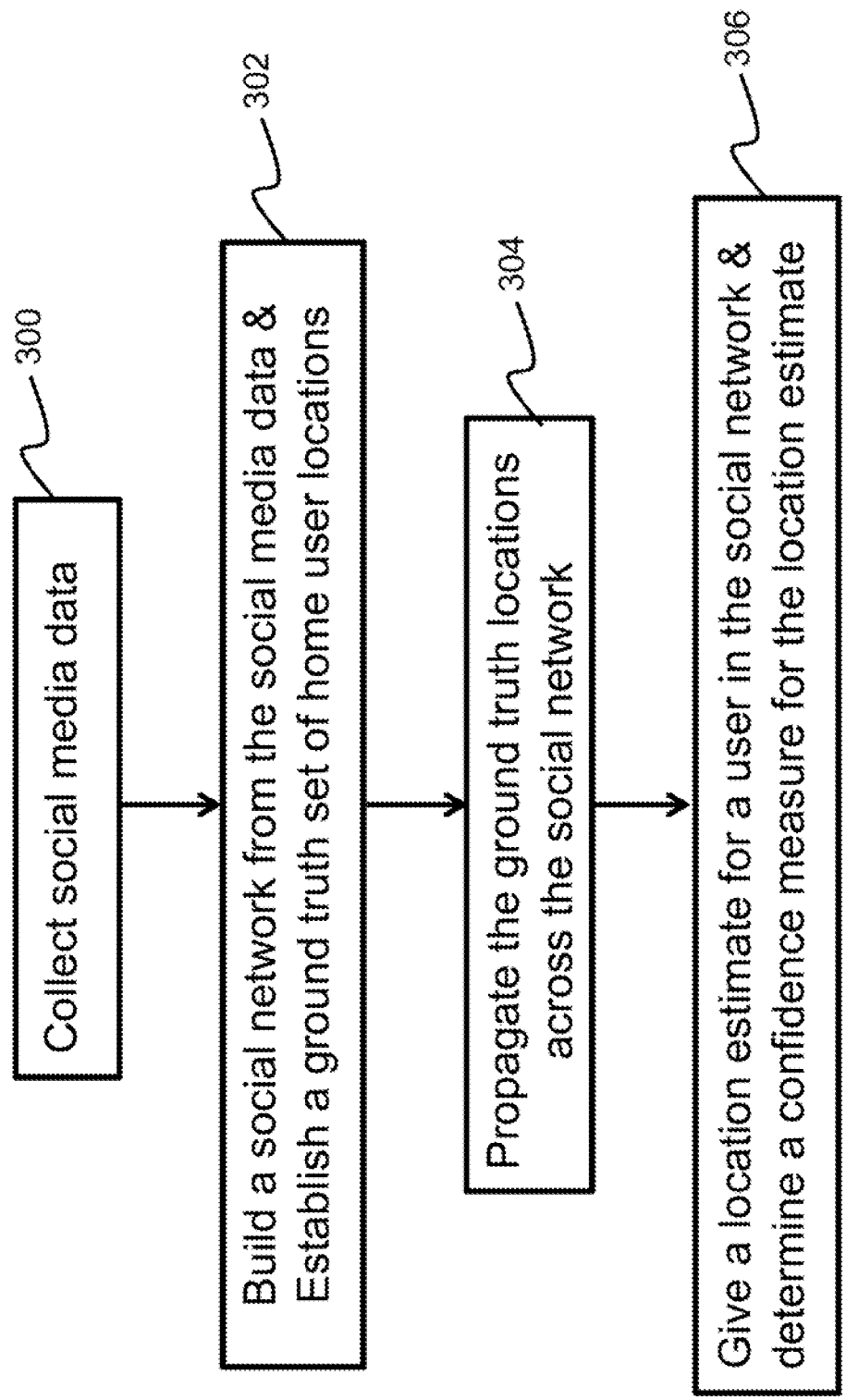
FIG. 3 is a flow diagram depicting a system for geocoding social networks according to the principles of the present invention.

FIG. 3 is a flow diagram illustrating the system according to the principles of the present invention. In a first operation 300, a large volume of social media data (e.g., Twitter™) is collected. In a second operation 302, a social network is built from the data collected in the first operation 300 based on communication (i.e., Twitter™ "@mentions" in the data) between users. GPS-tagged posts and self-reported locations were used to establish a ground truth set of home user locations. In a third operation 304, the ground truth locations were propagated across the social graph by solving a globally-define total variation-based optimization problem, as described above. Given a location estimate for a user in the social network, as constructed in the second operation 302, a confidence measure for the location estimate was computed using the median absolute deviation of the set of location estimates for the user's contacts in a fourth operation 306. To be precise, the confidence measure for user i is:

$$\mathrm{median}_j(d(f_i, f_j)).$$

The system can then proceed to report a geolocation of a user with a previously unknown location to an outside agency based on the location estimate.

(4.3) Experimental Results

The optimization according to the principles of the present invention was run on the triadic @mention network described in section 4.1.1. The graph consisted of 548,633,121 edges and 49,157,377 users. Nodes were placed in L when they were part of 23,798,393 ground-truth users described in section 4.1.2.

(4.3.1) Coverage

The term "coverage" with respect to the present invention refers to the number of Tweets™ and users that are geolocated. A total of 4,835,561,225 Tweets™ were examined between Jan. 1, 2013 and Apr. 7, 2013. These Tweets™ were generated by 117,215,282 users. Active Twitter™ users are more likely to be present in the @mention network and are, therefore, more likely to be geocoded by the system according to the principles of the present invention. Users were grouped by the number of times they have tweeted and, for each group, the probability that a user was geocoded by the system described herein increased remarkably as the user's activity level increased.

It was determined that statistics become noisy at levels of extreme tweeting activity. This is because a very small number of users were observed tweeting more than 1,000 times in the data sample used. Linear gains in bidirectional @mention graph size were obtained by uniformly increasing the number of @mentions which motivated the fusion of data streams for the experimental study.

(4.3.2) Accuracy

The accuracy was examined with 10-fold cross validation on the GPS users. From the 6,132,735 users who revealed GPS locations, ten experiments were performed where 613,273 test users who were not included in L were randomly selected. For each run, the median error between the GPS known locations and the inferred locations was determined. Averaging of the ten medians together gave a final error of 8.26 km.

Figure 4:
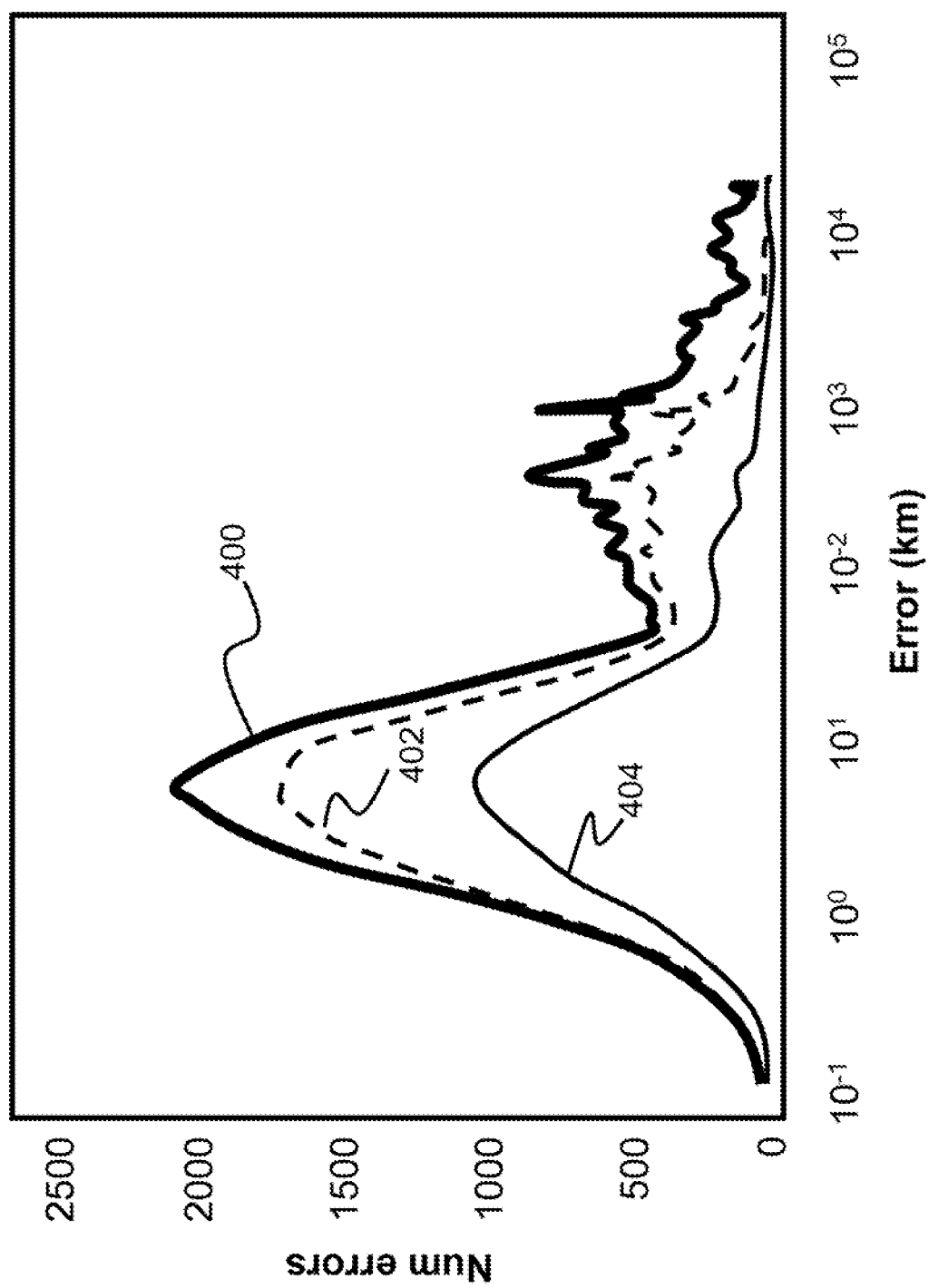
FIG. 4 is an illustration of geocoder errors for various restrictions on the median absolute dispersion of contacts according to the principles of the present invention.

It is important that large errors be reduced. Varying restrictions were placed on $\widetilde{v}_i$ and the errors for the GPS test users were histogrammed, as illustrated in FIG. 4. Along the x-axis is error in kilometers (km), and along the y-axis is numerical errors (i.e., the number of errors within each histogram bin). By discarding users whose median distance to contacts was greater than 100 km (represented by the bold curve 400), 500 km (represented by the dashed curve 402), or 1000 km (represented by the unbolded curve 404), outlying errors can be removed at the expense of coverage. This is indicated by the heights of the curves. As the heights decrease, the number of test points is decreased. In other words, it was found that the amount of large errors can be pushed to very small levels by controlling $\widetilde{v}_i$. One can control large errors by removing users from the data whose median distance to their contacts is high. Accuracy can be traded for coverage by placing restrictions on the maximum value of $\widetilde{v}_i$. Many small errors cannot be predicted by $\widetilde{v}_i$; however, removing large errors from the data is possible.

Figure 5:
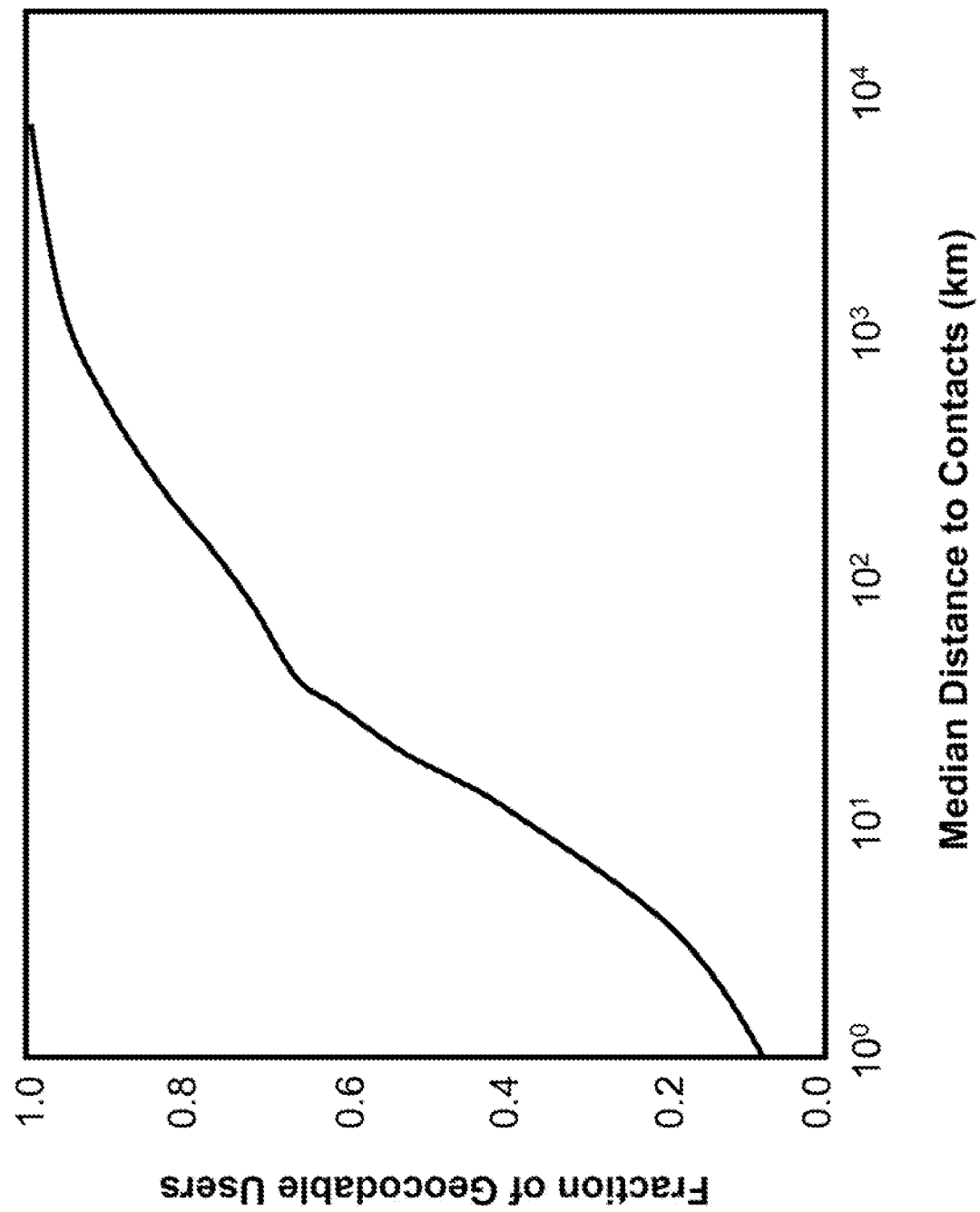
FIG. 5 is an illustration of the fraction of a geocoding database retained when users with varying median distance to contacts are removed according to the principles of the present invention.

Moreover, coverage was not substantially decreased when restricting $\widetilde{v}_i$. All 59,938,174 geocoded users in the social network were used to generate the plot in FIG. 5, which depicts the fraction of geocodable users as a function of $\widetilde{v}_i$. Along the x-axis is median distance to contacts, and along the y-axis is fraction of geocodable users. As shown, coverage remains high even when $\widetilde{v}_i$ is made small. In other words, restricting the median distance to a users' contacts does not substantially decrease coverage.

In summary, described is a total variation-based process for inferring the home locations of millions of Twitter™ users. By framing the social network geocoding problem as a global convex optimization, the work described in Literature Reference No. 1 is connected with an immense body of existing knowledge for future applications. Additionally, the system according to the principles of the present invention allows one to estimate the per-node accuracy of the geocoding process to ensure that errors remain small.

What is claimed is:

1. A system for geocoding social networks, the system comprising:
   one or more processors and a non-transitory computer-readable medium having executable instructions encoded thereon such that when executed, the one or more processors perform operations of:
   receiving a set of social media data from a social media platform having users;
   generating a social network from the set of social media data based on communication between users on the social media platform;
   determining a ground truth set of locations for users who make their locations public;
   propagating the ground truth set of locations across the social network to generate a location estimate for each user by employing a parallel coordinate descent technique to solve a globally-defined total variation-based optimization problem;
   generating a confidence measure for each location estimate;
   reporting a geolocation of a user with a previously unknown location to an outside agency with an interest in preventing social unrest; and
   wherein the globally-defined total variation-based optimization problem is as follows:

$$\min_f |\nabla f| \text{ subject to } f_i = l_i \text{ for } i \in L,$$

where f encodes a location estimate for each user i, L denotes a set of users who make their locations, $l_i$, public, and the total variation is defined by:

$$|\nabla f| = \sum_{ij} w_{ij} d(f_i, f_j),$$

where d represents the geodesic distance between user i and user j, and edge weights $w_{ij}$ denote graph connectivity between user i and user j in the social network.

2. A computer-implemented method for geocoding social networks, comprising:
   an act of causing a data processor to execute instructions stored on a non-transitory memory such that upon execution, one or more processors perform operations of:
   receiving a set of social media data from a social media platform having users;
   generating a social network from the set of social media data based on communication between users on the social media platform;
   determining a ground truth set of locations for users who make their locations public;
   propagating the ground truth set of locations across the social network to generate a location estimate for each user by employing a parallel coordinate descent technique to solve a globally-defined total variation-based optimization problem;
   generating a confidence measure for each location estimate;
   reporting a geolocation of a user with a previously unknown location to an outside agency with an interest in preventing social unrest; and
   wherein the globally-defined total variation-based optimization problem is as follows:

$$\min_f |\nabla f| \text{ subject to } f_i = l_i \text{ for } i \in L,$$

where f encodes a location estimate for each user i, L denotes a set of users who make their locations, $l_i$, public, and the total variation is defined by:

$$|\nabla f| = \sum_{ij} w_{ij} d(f_i, f_j),$$

where d represents the geodesic distance between user i and user j, and edge weights $w_{ij}$ denote graph connectivity between user i and user j in the social network.

3. A computer program product for geocoding social networks, the computer program product comprising computer-readable instructions stored on a non-transitory computer-readable medium that are executable by a computer having a processor for causing the processor to perform operations of:

receiving a set of social media data from a social media platform having users;

generating a social network from the set of social media data based on communication between users on the social media platform;

determining a ground truth set of locations for users who make their locations public;

propagating the ground truth set of locations across the social network to generate a location estimate for each user by employing a parallel coordinate descent technique to solve a globally-defined total variation-based optimization problem;

generating a confidence measure for each location estimate;

reporting a geolocation of a user with a previously unknown location to an outside agency with an interest in preventing social unrest; and wherein the globally-defined total variation-based optimization problem is as follows:

$$\min_{f} |\nabla f| \text{ subject to } f_i = l_i \text{ for } i \in L,$$

where f encodes a location estimate for each user i, L denotes a set of users who make their locations, $l_i$, public, and the total variation is defined by:

$$|\nabla f| = \sum_{ij} w_{ij} d(f_i, f_j),$$

where d represents the geodesic distance between user i and user j, and edge weights $w_{ij}$ denote graph connectivity between user i and user j in the social network.

4. The system as set forth in claim 1, wherein in generating the social network, the social network is generated from the set of social media data based on bi-directional communication between users having a mutual friend on the social media platform.

5. The system as set forth in claim 4, wherein the bi-directional communication is based on reciprocated @mentions on the social media platform.

6. The system as set forth in claim 1, wherein the one or more processors further perform an operation of propagating the ground truth set of locations by calculating an optimization based on geodesic distance and graph connectivity between each user.

7. The system as set forth in claim 1, wherein the confidence measure is calculated based on deviations of location estimates for a user's contacts.

* * * * *